United States Patent [19]

Hulicsko

[11] 4,040,489
[45] Aug. 9, 1977

[54] ROCK PICKER

[76] Inventor: Leslie Hulicsko, 1421-7th Avenue, Regina, Canada

[21] Appl. No.: 654,056

[22] Filed: Jan. 30, 1976

[30] Foreign Application Priority Data

June 4, 1975 Canada .................................. 228661

[51] Int. Cl.² ............................................ A01B 43/00
[52] U.S. Cl. ..................................................... 171/63
[58] Field of Search ..................... 56/11.9; 171/63–65, 171/85, 95, 98, 116, 128

[56] References Cited

U.S. PATENT DOCUMENTS

| | | | |
|---|---|---|---|
| 300,173 | 6/1884 | Weatherbee | 171/63 |
| 2,732,672 | 1/1956 | Fleischman | 171/63 |
| 2,751,745 | 6/1956 | Magee | 56/372 |
| 2,781,623 | 2/1957 | Anderson | 171/63 |
| 3,356,158 | 12/1967 | Deaver et al. | 171/63 |
| 3,599,724 | 8/1971 | Fraske et al. | 171/63 |

Primary Examiner—Russell R. Kinsey
Attorney, Agent, or Firm—Stanley G. Ade

[57] ABSTRACT

Conventional rock pickers usually consist of a rotary rake or a fixed prong assembly. The present device incorporates both systems and provides further for raising and lowering both the prong assembly and the rotary rake relative to the ground and secondly, it provides an hydraulic drive for the rotary rake so that both the speed and direction of rotation of the rotary rake can be controlled by the operator.

14 Claims, 3 Drawing Figures

ROCK PICKER

BACKGROUND OF THE INVENTION

This invention relates to new and useful improvements in rock picking devices. Conventionally such devices include a prong assembly or a rotary rake assembly and if a rotary rake assembly is utilized, the rotation of the rake assembly is provided by a drive shaft from the source of power or a live power takeoff from the wheels of the rock picker. This means that it is not possible to control the direction of rotation of the rotary rake and in many instances the speed of rotation is directly related to the speed of the rock picker across the ground.

Conventionally the prongs may be adjustable at ground level in order to catch the rocks which hit the prongs and these rocks then slide up and fall into the stone bucket immediately located behind it. In the event that the rocks jamb or pile up in front of the prongs, there is no way of clearing these without stopping the machine and manually removing the excess rocks.

Furthermore, conventional rock pickers normally do not provide means whereby a rock lodged in the earth, can be loosened and then removed.

SUMMARY OF THE INVENTION

The present invention overcomes all of these disadvantages by providing a prong assembly which can be raised and lowered relative to the ground in cooperation with a rotary rake assembly, the speed and direction of which can be controlled independently. This means that with the rotary rake assembly stationary, the device can be used to pick up relatively large stones which can then be tipped rearwardly into the stone bucket. Alternatively, the rotary rake can be used to move stones from the prong assembly to the stone bucket and if a jamb occurs, the rotary rake assembly can be reversed in rotation thus assisting in the freeing of the obstruction.

The prong assembly can be raised or lowered so that it can dig down to disengage a relatively large rock which may then be rolled rearwardly be elevating the prong assembly.

The principal object and essence of the invention is therefore to provide a device of the character herewithin described which includes a prong assembly and a rotary rake assembly incorporated therewith, said rotary rake assembly having an hydraulic drive so that the speed and direction of rotation can be controlled by the operator.

Another object of the invention is to provide a device of the character herewithin described which preferably is provided with two sets of raking teeth situated diametrically opposite one another so that they can be positioned to be clear of the prong assembly if it is desired to use the prong assembly only.

Another object of the invention is to provide a device of the character herewithin described in which the rotary rake assembly drive is completely independent of the speed of the rock picker across the ground.

A still further object of the invention is to provide a device of the character herewithin described which is simple in construction, economical in manufacture and other wise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
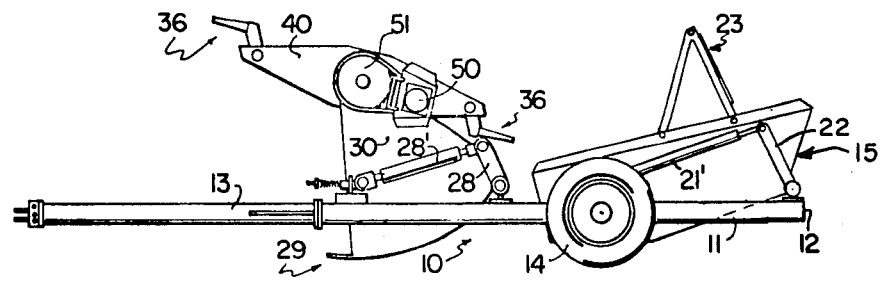
FIG. 1 is a side elevation of the device.
Figure 2:
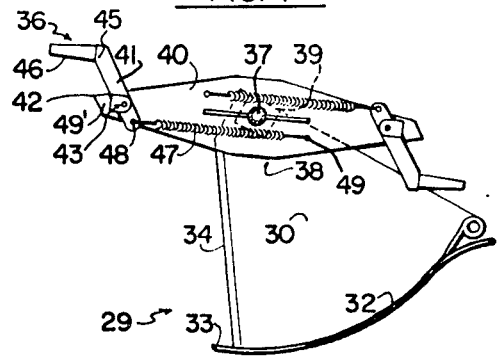
FIG. 2 is a fragmentary side sectional view of the prong assembly and rotary assembly on an enlarged scale.
Figure 3:
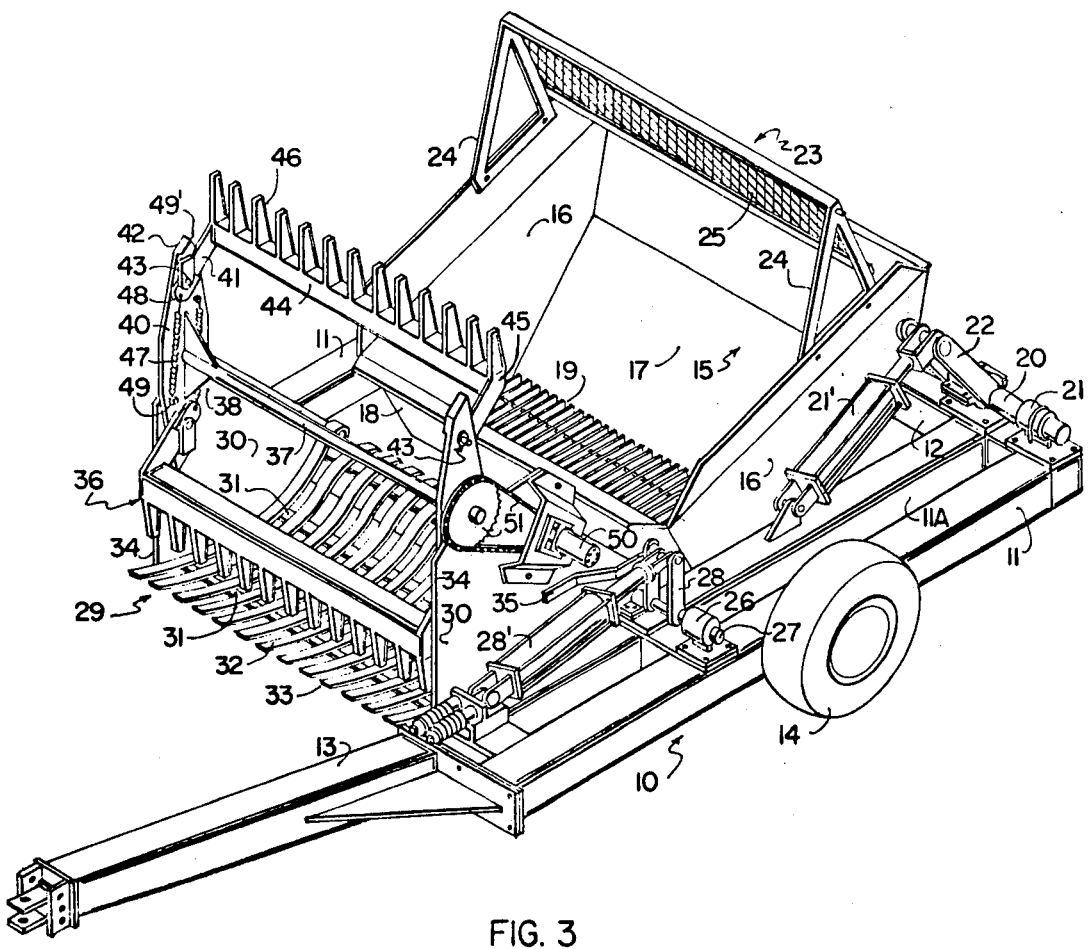
FIG. 3 is an isometric view of the device on an enlarged scale.

Proceeding therefore to describe the invention in detail, reference should be made to the accompanying drawings in which 10 illustrates a supporting framework including a pair of spaced and parallel side frame members 11 and a rear cross member 12 extending between the ends of the side frame members.

A hitch member or component 13 is secured to the front end of one of the side frame members 11 thus enabling the device to be connected to a source of towing power such as a tractor or the like.

Ground engaging wheels 14 are journalled for rotation upon each of the side frame members 11 and support the device above the ground.

A stone bucket collectively designated 15 is mounted within the rear side of the supporting frame 10 and includes spaced and parallel side plates 16, a rear apron 17, a front panel 18 and a perforated base 19 so that small stones and dirt may be sifted therethrough, from the stones collected within the stone bucket.

Mounting shafts 20 extend outwardly from each of the side panels 16 and are supported within pillar block bearings 21 supported by the rear cross member 12.

An operating link 22 is secured to one of the shafts 20 and a fluid operator 21' is operatively connected between one of the side frame members 11 and the distal end of the operating link 22 so that extension of the fluid operator will rotate the bucket assembly rearwardly so that any stones therewithin may be dumped upon the ground behind the device.

However, the stone bucket is normally in the position shown in the drawings.

A stone deflector 23 is secured to the upper side of the stone bucket and includes a pair of triangular frames 24 secured to the upper edges of the side panel 16.

A perforated screen or panel 25 is secured across the frames 24 and is situated so that when the bucket is in the lower-most position shown in the drawings, this panel inclines forwardly and upwardly towards the front of the assembly so that any stones striking this panel are deflected downwardly into the stone bucket.

On one side of the supporting frame 10, a reinforcing frame member 11A is provided in spaced and parallel relationship to one of the side frame members 11 and pillar block bearings 26 are supported upon both of these members and upon the other member 11.

A mounting shaft 27 is journalled within these pillar blocks and operating links 28 are secured to the shaft and extend upwardly therefrom.

A further fluid operator 28' is operatively connected between the side frame member 11 and the upper ends of these links 28, the purpose of which will hereinafter be described.

A prong assembly collectively designated 29 is provided and includes a pair of spaced and parallel side plates 30 mounted upon the cross shaft 27. Cross members 31 extend between the lower sides of the side plates 30 and these support curved pick up bars 32. A plurality of these curved pick up bars is provided in spaced and parallel relationship one with the other and the front ends 33 extends forwardly of the front edges 34 of the side plates and act as ground engaging ends.

The curvature of these bars is such that any stones picked up by the front ends 33, may be urged rearwardly into the stone bucket 15 as will hereinafter be described.

A bar 35 extends between adjacent the upper ends of the links 28 and one of the side plates 30 so that when the fluid operator 28' is extended, the prong assembly rotates around the shaft 27 so that any stones on the pick up bars 32, will be dumped into the stone bucket 15.

A rotary rake assembly collectively designated 36 is provided and includes a cross shaft 37 journalled for rotation within the upper portions 38 of the side plates 30 adjacent the front edges 34 thereof, bearings 39 supporting the shaft 37 for rotation.

A pair of side flanges 40 are secured adjacent each end of the shaft 37 and extends upon either side of the shaft as clearly shown.

Mounting members 41 are pivoted adjacent one end 42 of the side flanges 40 by means of pivot assemblies 43 and a cross bar 44 extends between the outer ends 45 of these mounting members. A plurality of stone picking teeth 46 are secured to and extend from the cross bars 44 in spaced and parallel relationship as clearly illustrated.

Tension springs 47 extend between the ends 48 of the mounting members and anchoring means 49 secured to the side flanges 40 and these springs normally maintain the mounting members and cross bars 44 in the position illustrated and against stops 49' provided on the extremities of the side flanges 40.

The pick up teeth 46 are positioned so that as the rotary rake assembly rotates within bearings 39, the pick up teeth 46 pass between the pick up bars 32.

A source of power taking the form of an hydraulic motor 50 is operatively connected to the rotary rake assembly 36 by means of chain and sprocket assembly 51 and the hydraulic motor is connected to a source of hydraulic pressure on the towing vehicle by conventional means (not illustrated). This means that the rotary rake assembly can be rotated at any desired speed within limits and in either direction.

In operation, the prong assembly and rotary rake assembly being mounted as one unit, may be raised and lowered by means of the fluid operator 28' so that the front ends 33 of the pick up bars may be adjusted as desired relative to the ground.

If relatively large rocks are being picked up or if rocks are being disengaged from the ground, the rotary rake assembly is stationary and is positioned so that the two sets of pick up teeth are substantially horizontal to the ground and clear of the pick up bars 32.

When a relatively large stone or stones has been engaged by the pick up bars, the fluid operator 28 may be actuated thus partially rotating the prong assembly clockwise relative to the drawings so that the rocks roll from the pick up bars 32 into the stone bucket 15.

If ordinary stones are being picked up by the pick up bars 32, the rotary rake assembly may be rotated counterclockwise relative to the drawings so that the teeth 46 sweep the stones rearwardly from the pick up bars and deposit same into the stone bucket 15 and if any relatively small stones strike the screen 25, they are deflected downwardly into the bucket.

Occasionally stones may jamb in front or between the pick up bars 32 under which circumstances the direction of rotation of the rotary rake assembly may be reversed thus assisting in freeing stones and clearing the obstruction whereupon the device may be actuated again in the usual manner.

The flexibility of the machine is such that stone picking under almost any conditions can be undertaken including the digging of relatively large stones from the ground and clearing any obstructions from the pick up teeth.

The hydraulic motor 50 enables independent rotation of the rotary rake assembly in either direction and the ruggedness of the construction allows the machine to be used under the majority of conditions.

Although only two sets of rotary rake teeth 46 are shown, nevertheless it will be appreciated that more can be provided depending upon design parameters.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A rock picker comprising in combination a supporting frame, a stone bucket in said frame, ground engaging wheels mounted on said frame, a prong assembly mounted within said frame, means mounting said prong assembly for raising and lowering same relative to the ground, a rotary rake assembly mounted in said frame above said prong assembly, and power means operatively connected to said rotary rake assembly for rotating same at varying speeds and in either direction, said rotary rake assembly cooperating with said prong assembly to move stones from said prong assembly into said stone bucket, said rotary rake comprising a cross shaft journalled for rotation in said frame above said prong assembly, at least two sets of raking teeth mounted diametrically upon said shaft, means mounting said teeth upon said shaft, said last mentioned means including a pair of side flanges secured one to adjacent each end of said shaft, stop means on said side flanges adjacent each end thereof, a mounting member pivoted by one end thereof to adjacent each end of said side flanges, a cross bar extending between the other ends of the corresponding mounting members of said side flanges, and a plurality of stone picking teeth secured to and extending from said cross bar, and tension spring means extending between said mounting member and said side flanges normally urging said mounting member against said stop means.

2. The rock picker according to claim 1 in which said prong assembly includes a pair of spaced and parallel substantially vertical side plates and a plurality of spaced and parallel pick up bars mounted between said side plates and adjacent the lower side thereof, said pick up bars having ground engaging front ends.

3. The rock picker according to claim 1 in which said rotary rake assembly is operatively connected to said means to raise and lower said prong assembly relative to the ground whereby said rotary rake assembly moves simultaneously with said prong assembly.

4. The rock picker according to claim 3 which includes a stone deflector mounted above said stone bucket and inclining upwardly and forwardly towards said rotary rake assembly, said stone deflector including a supporting frame and a deflector panel mounted in said frame.

5. The rock picker according to claim 2 in which said rotary rake assembly is operatively connected to said means to raise and lower said prong assembly relative to the ground whereby said rotary rake assembly moves simultaneously with said prong assembly.

6. The rock picker according to claim 5 which includes a stone deflector mounted above said stone bucket and inclining upwardly and forwardly towards said rotary rake assembly, said stone deflector including a supporting frame and deflector panel mounted in said frame.

7. The rock picker according to claim 1 which includes a stone deflector mounted above said stone bucket and inclining upwardly and forwardly towards said rotary rake assembly, said stone deflector including a supporting frame and a deflector panel mounted in said frame.

8. The rock picker according to claim 2 which includes a stone deflector mounted above said stone bucket and inclining upwardly and forwardly towards said rotary rake assembly, said stone deflector including a supporting frame and a deflector panel mounted in said frame.

9. The rock picker according to claim 1 in which said shaft is mounted to said side plates, the individual picking teeth passing between adjacent pick up bars.

10. The rock picker according to claim 9 in which said rotary rake assembly is operatively connected to said means to raise and lower said prong assembly relative to the ground whereby said rotary rake assembly moves simultaneously with said prong assembly.

11. The rock picker according to claim 10 which includes a stone deflector mounted above said stone bucket and inclining upwardly and forwardly towards said rotary rake assembly, said stone deflector including a supporting frame and a deflector panel mounted in said frame.

12. The rock picker according to claim 2 in which said shaft is mounted to said side plates, the individual picking teeth passing between adjacent pick up bars.

13. The rock picker according to claim 12 in which said rotary rake assembly is operatively connected to said means to raise and lower said prong assembly relative to the ground whereby said rotary rake assembly moves simultaneously with said prong assembly.

14. The rock picker according to claim 13 which includes a stone deflector mounted above said stone bucket and inclining upwardly and forwardly towards said rotary rake assembly, said stone deflector including a supporting frame and a deflector panel mounted in said frame.

* * * * *